US008243871B2

(12) United States Patent
Hrovat et al.

(10) Patent No.: US 8,243,871 B2
(45) Date of Patent: Aug. 14, 2012

(54) SPHERICAL FUEL ELEMENT AND PRODUCTION THEREOF FOR GAS-COOLED HIGH TEMPERATURE PEBBLE BED NUCLEAR REACTORS (HTR)

(75) Inventors: Milan Hrovat, Rodenbach (DE); Karl-Heinz Grosse, Gruendau (DE); Rainer Schulten, Muenster (DE)

(73) Assignee: ALD Vacuum Technologies GmbH, Hanau (DE)

( * ) Notice: Subject to any disclaimer, the term of this patent is extended or adjusted under 35 U.S.C. 154(b) by 623 days.

(21) Appl. No.: 12/439,203

(22) PCT Filed: Aug. 28, 2007

(86) PCT No.: PCT/EP2007/058907
§ 371 (c)(1),
(2), (4) Date: Mar. 17, 2009

(87) PCT Pub. No.: WO2008/025757
PCT Pub. Date: Mar. 6, 2008

(65) Prior Publication Data
US 2010/0014625 A1  Jan. 21, 2010

(30) Foreign Application Priority Data
Aug. 29, 2006  (DE) .......................... 10 2006 040 309

(51) Int. Cl.
*G21C 19/28* (2006.01)
(52) U.S. Cl. .......................... 376/381; 376/417; 376/409
(58) Field of Classification Search .................. 376/381, 376/417, 409; 264/0.5
See application file for complete search history.

(56) References Cited

U.S. PATENT DOCUMENTS

| | | | | |
|---|---|---|---|---|
| 3,095,316 A | | 6/1963 | Hartwig | |
| 3,166,614 A | * | 1/1965 | Taylor | 264/0.5 |
| 4,271,101 A | * | 6/1981 | Hrovat et al. | 264/0.5 |
| 4,293,512 A | | 10/1981 | Luhleich et al. | |
| 4,299,881 A | | 11/1981 | Luhleich et al. | |
| 5,037,606 A | * | 8/1991 | DeVelasco et al. | 376/411 |
| 5,192,495 A | * | 3/1993 | Caldwell et al. | 376/417 |
| 5,236,638 A | | 8/1993 | Schulten et al. | |
| 2004/0052326 A1 | * | 3/2004 | Blanpain et al. | 376/411 |

FOREIGN PATENT DOCUMENTS

| | | |
|---|---|---|
| DE | 1 269 559 | 5/1968 |
| DE | 27 18 143 A1 | 11/1978 |
| DE | 41 27 693 A1 | 2/1993 |
| DE | 198 37 989 C2 | 3/2000 |
| DE | 101 44 352 A1 | 4/2003 |
| DE | 102 04 166 A1 | 8/2003 |
| DE | 102 53 205 A1 | 6/2004 |
| GB | 1 478 037 | 6/1977 |
| JP | 53-133208 A | 11/1978 |
| JP | 7-035533 A | 2/1995 |
| JP | 2002-303692 A | 10/2002 |
| JP | 2005-195454 A | 7/2005 |
| JP | 2005-257490 A | 9/2005 |
| JP | 2005-337947 A | 12/2005 |
| JP | 2006-124257 A | 5/2006 |

OTHER PUBLICATIONS

Sevastyanov et al., Thermodynamic Analysis of the Production of Silicon Carbide via Silicon Dioxide and Carbon, Materials Science Forum, vol. 457-460, Jun. 2004, pp. 59-62.*
K.G. Hackstein et al.; "Recent Developments in the Manufacture of Spherical Fuel Elements for High-Temperature Reactors"; SM-111/15, Symposium Advanced High-Temperature Gas-Cold Reactors, Oct. 1968.
H. Nickel; "Entwicklung von beschichteten Brennstoffteilchen"; KFA Report, Juelich, 687-RW (Aug. 1970).
M. Hrovat et al.; "Diffusion von Uran in Graphit"; Journal of Nuclear Materials, 19 (1966), pp. 53-58.
K. Koizlik; "Ueber die Anderung der Anisotropie der kristallographischen Orientierung in Pyrokohlenstoffhuellschichten von Brennstoffteilchen durch Gluehung und Neutronenbestrahlung"; KFA-Report, Juel-868-RW (Jun. 1972).
G.B. Eagle; "Irradiation Behavior of Nuclear Graphites at Elevated Temperatures"; Gulf General Atomic Report (Mar. 1970).
J.W. Helm; "Irradiation of Graphite at Temperatures of 300 to 1200°C"; AEC Research & Development Report; BNWL-1056A, Jun. 1969.
J.W. Helm; "Irradiation of Graphite at Temperatures of 300 to 1200°C"; AEC Research & Development Report; BNWL-1056B, Aug. 1969.
M. Hrovat et al.; "Ueber die Entwicklung eines Matrixmaterials zur Herstellung gepresster Brennelemente fuer Hochtemperatur-Reaktoren"; Juel-969-RW, Jun. 1973.
G. Spener et al.; Proceedings of the Conference for "Fuel Cycles of High Temperature Gas-Cooled Reactors"; Brussels, Jun. 10-11, 1965.

* cited by examiner

*Primary Examiner* — Ricardo Palabrica
(74) *Attorney, Agent, or Firm* — Dickstein Shapiro LLP

(57) ABSTRACT

The invention relates to a novel design and production of fuel element pebbles which satisfy the requirements of high temperature pebble bed nuclear reactors of the next generation. The invention uses a shell of the fuel element pebbles that is devoid of fuel and consists of silicon carbide (SiC) and/or zircon carbide (ZrC), in addition to natural graphite and graphitized petroleum coke, said shell having a maximum average nominal thickness of 5 mm and preferably only 3 mm.

17 Claims, No Drawings

SPHERICAL FUEL ELEMENT AND PRODUCTION THEREOF FOR GAS-COOLED HIGH TEMPERATURE PEBBLE BED NUCLEAR REACTORS (HTR)

The fuel element for high temperature pebble bed nuclear reactors (hereinafter referred to as HTR) is a graphite sphere of 60 mm diameter that is produced by molding of special A 3-type graphite. The fuel element for HTR consists of a fuel-comprising core with 50 mm diameter that is surrounded by a fuel-free shell of 5 mm thickness. The core of the fuel element sphere (FE-sphere) is seamlessly bonded to the shell and thus forms a unit with it. The fuel is homogeneously distributed in the form of coated fuel particles within the sphere core.

The coated particles are spheres of about 0.5 mm diameter (fuel kernels) preferably consisting of uranium oxide. These kernels are coated multiple times with layers of pyrolytic carbon and silicon carbide in order to retain the fission products which are generated during reactor operation.

The spherical fuel kernels are preferably obtained by the gel supported precipitation method. This method includes forming drops of a solution of uranyl nitrate with additives of polyvinyl alcohol and tetrahydrofurfuryl alcohol by vibrating nozzles. The solution is then solidified to spherical fuel kernels of ammonium diuranate (ADU) by using $NH_3$ as well as $NH_4OH$. After washing, drying, reducing and sintering, $UO_2$-fuel kernels of high density having desired diameters are obtained.

The coating of the fuel kernels with pyrolytic carbon and silicon carbide is usually performed in fluidized bed units. These units (furnaces) consist of a vertically standing graphite tube with a conical bottom which is heated from outside by means of a graphite resistance heater. Several nozzles are placed to the end at the top point of the core. They provide the carrier gas argon or hydrogen as well as coating gases into the unit for fluidized bed operation. The pyrolytic carbon layers are deposited by thermal decomposition of ethine or a mixture of ethine and propine from the gaseous phase at temperatures between 1000° C. and 1400° C. In case of coating with silicon carbide, methyl trichlorosilane preferably serves as the coating gas. In this case the deposition temperature is slightly higher and amounts to 1500° C. Depending on the coating conditions, several layers of different densities and structures with different physical and mechanical properties are obtained.

This method is inter alia published in SM-111/15, Symposium "Advanced HighTemperature Gas-Cooled Reactors" in Jülich on 21. to 25. October 1968 and in "Recent Development in the Manufacture of Spherical Fuel Elements for High Temperature Reactors" (Hackstein, K. G., Hrovat, M., Spener, G., Ehlers, K.) and KFA Report, Jülich, 687-RW (August 1970), "Entwicklung von beschichteten Brennstoffteilchen" (H. Nickel) as well as in the German patent DE 102 04 166 and the German publication DE 101 44 352 A1.

The HTR fuel element spheres have to meet many requirements:
 high geometrical density of the graphite matrix
 good mechanical strength properties
 low young modulus
 low coefficient of thermal extension
 good heat conductivity and
 high stability upon irradiation with fast neutrons.

In order to achieve these properties molded bodies manufactured from carbon have to be subjected to a graphitizing process at temperatures between 2700° C. and 3000° C.

As the molded fuel element spheres comprise coated fuel particles within the sphere core after molding, a graphitizing process at temperatures above 2700° C. cannot be done. The decisive reasons for that are:

Already at temperatures above 2100° C. the uranium diffuses from the fuel kernels into the coating layers of the particles and further into the graphite matrix of the fuel element sphere. The uranium that diffused into the porous graphite matrix of the fuel element sphere outside the coating would have led to impermissibly high contamination of the cooling gas with the released fission products during reactor operation. Diffusion of uranium in graphite is described in Journal of Nuclear Materials, 19 (1966), pages 53-58 by Hrovat, M. and Spener, G.

Furthermore, the pyrolytic carbon layers change their structure at temperatures above 2100° C. Thereby anisotropy of the crystallographic orientation of the pyrolytic carbon increases significantly. Consequently, there is the risk of the coated particles losing their mechanical integrity in the reactor very early. This would lead to the risk of radioactive fission products being spontaneously released. The results are described in KFA-Report "Jül-868-RW" (June 1972), "Über die Änderung der Anisotropie der kristallographischen Orientierung in Pyrokohlenstoffhüllschichten durch Glühung und Neutronenbestrahlung" by Koizlik, K.

The pertinent literature teaches that graphite only keeps its dimensional stability and mechanical integrity upon radiation with fast neutrons in temperatures above 1000° C., if it is highly crystalline and isotropic. The irradiation process and the corresponding results are inter alia described in: GA-Report (March 1970), "Irradiation Behaviour of Nuclear Graphites at Elevated Temperatures", by Engle, G. B. and PNWL-1056 Report (1969), Pacific Northwest Laboratory Richland/Wash., by Helm, J. W.

In order to ensure dimensional stability and mechanical integrity of the molded fuel element spheres during the whole residence time in the reactor, in spite the heat treatment being limited to only about 2000° C., a special graphite has been developed. The special graphite is referred to in technical literature as A 3-graphite matrix. A 3-graphite matrix is based on natural graphite. Natural graphite shows extremely high crystallinity. Its primary particles are, however, lamellar with hexagonal crystalline order ("Syngonie") and are thus highly anisotropic.

In order to achieve the required isotropy of the physical properties of the matrix the fuel element spheres are molded in a rubber die, preferably a silicon rubber. The cylindrical rubber die is setup of several parts having an ellipsoid cavity in the center for reception of the mixture of molding powder and fuel. This cavity has such measures that already at a pressure of above 5 MPa a sphere is formed. The rubber die is inserted into a steel die of the compactor and is compressed between lower and upper punches.

For manufacturing the fuel element spheres a mixture of graphite molding powder and overcoated particles are pre-molded into manageable sphere cores. Then the pre-molded sphere core is embedded into graphite molding powder in a second rubber die and is molded at elevated pressure to yield a permeable, air permeable sphere. This remolded sphere is then molded in a third rubber die in vacuum to the desired density.

For carbonization of the binder the fuel element spheres are heated in inert gas atmosphere to 800° C. within 18 hours and are finally annealed in vacuum at about 2000° C. The A 3-graphite matrix consists of 72.7% by weight of natural graphite, 18.2% by weight of petroleum coke (graphitized in powder form at 3000° C.) and 9.1% by weight of binder coke.

The method is described in German patent and publication pamphlets DE 198 37 989 C2 and DE 102 53 205 A1.

In order to not only provide fuel element spheres that are isotropic but also show hardly any property gradient, the fuel element spheres are molded in a third molding step at a high pressure of 300 MPa to a density of 1.92 g/cm$^3$, which is approximately 99% of the theoretical density. Upon pressure release the density decreases to a value of 1.8 g/cm$^3$, decreases further upon heat treatment and reaches a minimum value of 1.6 g/cm$^3$ at 280° C. At this temperature the binder resin starts to carbonize while producing gaseous crack products.

Adjustment of the required porosity is done by adding a portion of electro graphite powder. Thereby a nearly pressureless degassing of the matrix is achieved, thus avoiding cracks in the matrix. While the carbonization of the resin proceeds, the graphite matrix begins to shrink and reaches a relatively high final density of 1.72 g/cm$^3$ at around 850° C. Weight loss of the sphere matrix by carbonizing of the resin amounts to about 9% by weight.

Optimization of the A 3-graphite matrix is described in KFA-Report, Jül.-969-RW, June 1973, "Über die Entwicklung eines Matrixmaterials zur Herstellung gepresster Brennelemente für Hochtemperaturreaktoren" by Hrovat, M., Nickel, H. and Koizlik, K.

During the seventies and eighties of the twentieth century more than a million of molded A 3 fuel element spheres have been used in the pebble bed reactor AVR in Jülich and the thorium high temperature reactor (THTR) in Schmehausen/ Uentrop. The fuel element spheres have proven themselves in continuous operations and have shown immaculate behaviour.

The nuclear reactors of later generations additionally make further demands on HTR fuel elements. The fuel element spheres have to stay intact at full reactor power and may not release impermissible fission products in case a hypothetical accident happens and, for example, a complete cooling breakdown and/or uncontrolled break-in of air, water or water vapor into the reactor core happens. In order to provide for these prerequisites A 3-fuel element spheres have to have improved corrosion resistance against oxygen or water vapor.

In order to determine corrosion resistance a standard testing procedure is conducted. In this standard testing procedure the fuel element spheres are heated to 1000° C. in an inert gas atmosphere comprising water vapor, and resulting weight loss is determined. The reaction gas is a mixture of argon with 1% volume of water vapor. This mixture is manufactured in a moisturizing container which is filled with water. During this manufacturing procedure the argon gas that bubbles through the water is saturated with water vapor. The volumetric flow rate of the reaction gas is 150 l/hr and is selected such that only about 20% of available oxygen reacts with the graphite matrix of the sphere in the given test conditions. The corrosion rate is the burn-up of the graphite per hour in milligrams per square centimeter of sphere surface. The value is determined at 1000° C. using A 3 fuel element spheres, the value is in the range of from 1 to 1.25 mg/cm$^2$ per hour. The reference value for nuclear-pure ATJ reactor graphite of Union Carbide Corporation (UCC), which has been graphitized at 3000° C., is significantly lower at 0.7 mg/cm$^2$ per hour.

Long term corrosion tests revealed that within the A 3 fuel element spheres preferably the binder coke which has formed from the phenol formaldehyde resin reacted with the water vapor and thus led to selective burn-up of the matrix. In contrast to natural graphite and graphitized petroleum coke the binder coke showed a significantly higher chemical affinity and consequently a higher reaction rate of the oxidation with water vapor.

In order to prove the selective oxidation of the binder coke the oxidized fuel element spheres which had been subjected to the corrosion test procedure where subsequently subjected to an attrition test. For testing the attrition the fuel element spheres were moved into a rotating barrel which rotated at 55 rotations per minute. A chamfered threshold of 2 mm height on the inner surface of the barrel provided for the fuel element spheres permanently being in motion and not sliding on the inner surface of the barrel. Holes on the bottom and lid of the barrel provided for an unresisted exit of attrited graphite matrix.

The attrited graphite matrix was analyzed for crystallinity by X-Ray microstructure analysis. The crystallite size was 90 nm and hence constitutes a very high value and can only be attributed to the graphite components of natural graphite and graphitized petroleum coke. The corresponding Lc value of the binder coke is approximately one order of magnitude lower and could not be determined. The absence of binder coke in the attrited graphite matrix is a proof for selective burning up of coke during the corrosion test procedure (oxidation). Selective burning up of binder coke is thus the main reason for loss of strength in the graphite matrix in connection with shaving of the surface of the fuel element spheres.

Procedure for increasing corrosion resistance in graphite molded bodies are known from DE 41 27 693 A1, DE 27 18 143 and DE 12 69 559. In these documents the molded bodies are improved in terms of corrosion resistance by applying protective layers comprising SiC and/or ZrC after completion. Such subsequent coating is not done for the fuel element spheres made from A 3 graphite and, consequently, there is no coating that could hamper selective burning-up of the binder coke, which decisively causes corrosion of the sphere shaped fuel elements. Furthermore, subsequent compression processes are labour-intensive and expensive.

It is the object of the present invention to provide a new concept for fuel element spheres and their production, meeting the prerequisites of high temperature pebble bed nuclear reactors of later generations. This object is solved by the subject-matter of the patent claims.

The object is especially solved by the fuel element spheres comprising a fuel-free shell of silicon carbide (SiC) and/or zirconium carbide (ZrC) as well as natural graphite and graphitized petroleum coke, the shell having an average nominal thickness of at least 1 mm, preferably at least 2 mm and most preferably at least 3 mm. It is further preferred that the average nominal thickness is in a range of from 1 to 5 mm, even further preferred in a range of from 2 to 5 mm and most preferred in a range of 2 to 4 mm, wherein 3 mm is a possible embodiment.

Determination of the average nominal thickness of the fuel-free layer is done by means which are known to the person having skill in the art. The values given above include a range of tolerance (due to accuracy of measurement) of +/−0.5 mm.

The proportion of silicon carbide in the fuel-free shell is in the range of from 6 to 14% by weight, further preferred in the range of from 8 to 12% by weight, even further preferred in the range of from 9 to 11% by weight and most preferred in the range of from 9 to 10% by weight, wherein 10% by weight is a possible embodiment.

The proportion of zirconium carbide in the fuel-free shell is in the range of from 10 to 30% by weight, further preferred in the range of from 15 to 30% by weight, even further preferred in the range of from 19 to 25% by weight and most preferred in the range of from 20 to 23% by weight, wherein 22.3% by weight is a possible embodiment.

The main aspect of the present invention is the use of the high chemical affinity of the binder coke. This has in the past been a disadvantage in corrosion tests. However, in the tests it has surprisingly been found that the chemical affinity of the binder coke can be used by adding a silicon and/or zirconium compound to the molding powder for the shell. Similar to oxidation with water vapor the silicon and/or zirconium compound selectively reacts with the carbon of the binder coke during annealing of the fuel element spheres in vacuum at a maximum temperature of 2000° C. Thereby almost only the proportion of binder coke of the A3 graphite matrix which is accountable for corrosion is reacted to the corrosion resistant SiC or ZrC. Both carbides SiC and ZrC are well proven reactor materials with cubic crystalline structure ("Syngonie") and thus inherently isotropic. SiC and ZrC are characterized by high hardness, high mechanical strength and very good corrosion resistance. By application of SiC or ZrC in the production of A 3 graphite matrix such properties of the fuel element spheres like density, load at brake and especially corrosion resistance are significantly improved and the prerequisites of fuel element spheres for pebble bed reactors of later generations are met.

As a consequence of improved corrosion resistance and mechanical strength properties the thickness of the fuel free shells of the fuel element spheres can be decreased. Thereby the relative volume of the fuel containing sphere core is increased and subsequently the fuel temperature is decreased. A lower fuel temperature improves retention capability for fission products of the coated particles significantly.

In the production of sphere shaped fuel elements according to the present invention the same graphite molding powder is used for the shell as well as for production of the fuel-containing core. During production of the fuel elements the graphite matrix is formed from the molding powder, which graphite matrix is consequently the same for shell and core. The fuel elements according to the present invention can thus be described by the feature of similar or identical composition of the graphite matrix in the fuel-containing core and fuel-free shell. This feature is important especially for distinction from other sphere shaped fuel elements which do not comprise this identity of graphite matrix. Such fuel elements preferably comprise a shell of electro graphite and are for example described in the publication: "Fuel Development for THTR", G. Spencer, M. Hrovat and L. Rachor, Proceedings of the Conference "Fuel cycles of the HTGR", Brussels, June 1965.

In order to describe the similarity of the graphite matrices it shall be noticed that for production of the fuel-containing core and the fuel-free shell the same graphite molding powder is used, which finally forms said graphite matrix. The term "similarity" is used with respect to the fact that silicon or zirconium compounds are added to the graphite molding powder which is used for pre-molding of the fuel-free shell, in the above-mentioned amounts.

The following examples shall further describe the provision of the fuel element spheres according to the present invention and their novel conception without restricting the scope of the invention:

EXAMPLE 1

Application of $SiO_2$

Production of the graphite molding powder has been done in two separate homogenization batches: The molding powder for the sphere core and the molding powder for the sphere shell. For production of the molding powder for the sphere core a nuclear-pure natural graphite was pre-mixed with petroleum coke which had been graphitized at 3000° C. in a weight ratio of 4:1 in dry condition. Relative to the graphite components 20% by weight of phenol formaldehyde binder resin dissolved in methanol was added and homogenized in a kneader mixer at room temperature. The material to be kneaded was dried at 105° C. in vacuum (P<50 hPa) and afterwards broken down in a hammer mill with sieves adjusted to 1 mm. For production of the molding powder for the sphere shell all process steps except preparation of the $SiO_2$ suspension remained unchanged. The proportion of $SiO_2$ powder amounted to 83.4% by weight relative to the binder resin.

The starting compounds had the following properties:

natural graphite with labeling FP of the supplier Kropfmühl, bulk density 0.4 $g/cm^3$, grain density 2.26 $g/cm^3$, BET-surface 2 $m^2/g$, crystallite size Lc=100 nm, average particle size 10 to 20 µm, ash content 200 ppm and boron equivalent from impurities of the ash <1 ppm.

graphitized petroleum coke with the labeling KRB <0.1 mm of the supplier Ringsdorff, graphitizing temperature 3000° C., bulk density 0.65 $g/cm^3$, grain density 2.2 $g/cm^3$, BET-surface 1.2 $m^2/g$, crystallite size Lc=60 nm, average particle size 30 to 40 µm, ash content 10 ppm and boron equivalent form impurities of the ash <1 ppm.

phenol formaldehyde resin of the type Novolak with the labeling 4911 of the supplier Bakelite, condensation agent HCl, molecular weight 690, softening point 101° C., pH-value=6, acid value=7.5, free phenol 0.12% by weight, coke yield 50%, solubility in methanol 99.97% by weight, ash content 160 ppm and boron equivalent from the impurities of the ash 1 ppm. In order to increase molecular weight the resin has been subjected to steam distillation after condensation.

$SiO_2$ powder, finely ground commercial $SiO_2$ powder with an average partide size of from 1 to 5 µm and a purity of 99.95%.

The coated fuel particles with a diameter of about 0.9 mm were overcoated with a part of the graphite molding powder which had been produced for the sphere core in a rotating drum under addition of small amounts of nebulized resin solvent. This procedure was done until the particles were covered by a porous overcoating layer which was about 0.2 mm thick.

The coated $UO_2$-fuel particles had a core diameter of 0.5 mm and a density of 10.6 $g/cm^3$. The fuel kernels were coated four times, first with a buffer layer of pyrolytic carbon (thickness 95 µm, density 1.05 $g/cm^3$), then with a dense pyrolytic carbon layer (thickness 40 µm, density 1.90 $g/cm^3$), afterwards with a dense SiC layer (thickness 35 µm, density 3.19 $g/cm^3$) and finally with a dense pyrolytic carbon layer (thickness 40 µm, density 1.90 $g/cm^3$). The coated particles, overcoated with molding powder, were dried and mixed portion after portion with further graphite molding powder in a weight ratio of 1:2.23.

A portion of this mixture weighing 164 g which constitutes 29.3 g coated fuel particles, was charged into the first rubber die. This rubber die was molded in a steel die at 5 MPa. In a rubber die with ellipsoid shaped cavity of 205 $cm^3$ and an axial ratio of 1:1.17 a manageable sphere with a diameter of about 62 mm and a density of 1.2 $g/cm^3$ was obtained. This sphere was embedded into lose layer of graphite molding powder with $SiO_2$ additive in a second rubber die. Within an axial ratio of 1:1.14 the volume of the ellipsoid shaped cavity was 295 $cm^3$. After molding of the die at 15 MPa a sphere with about 68 mm diameter, a weight of 240 g and a density of 1.45 g/cm$^3$ was obtained. This pre-molded sphere was placed in a third accurately fitting rubber die and subjected to a final molding in vacuum (P<120 hPa) at high pressure of 300 MPa. Under the pressure of 300 MPa the density of the graphite matrix was 1.94 g/cm$^3$. With the chosen composition of the graphite molding powder this density equals the value of 99% of the theoretical density. After load release the density of the graphite matrix decreased from 1.94 g/cm$^3$ to 1.82 g/cm$^3$. To carbonize the binder the spheres were heated to 800° C. in a nitrogen purge for 18 hours and finally annealed in vacuum (P<10$^{-2}$ hPa) at 1900° C. During this process step the binder coke which had been formed from the phenol formaldehyde resin according to the present invention reacted with SiO$_2$ to SiC.

EXAMPLE 2

Application of ZrO$_2$

Except for the replacement of the SiO$_2$ powder by ZrO$_2$ powder the further production steps of the molding powder production remain unchanged, i.e. as described in example 1.

The ZrO$_2$ proportion in the methanol resin solution was 167% by weight relating to the binder resin. The applied ZrO$_2$ powder with the labeling TZ of the supplier Toyo Soda had an average particle size of about 1 μm and a purity of 99.99%.

After heat treatment and machining of the fuel element spheres to a diameter of 60 mm the following properties were determined:
  geometrical density of the fuel-free sphere shell,
  thickness of the fuel-free shell (thickness was determined by means of X-Ray analysis),
  load at brake, this parameter was determined by crushing the fuel element spheres between two steel plates and measuring the load at brake,
  SiC or ZrC amount in the sphere shell (determination was done by chemical analysis and X-Ray micro structure analysis) and
  corrosion resistance (the fuel element spheres were subjected to the standard oxidation test procedure).

The results are listed in the following table and compared to the values of the A 3-fuel element spheres.

| fuel element sphere/property | with SiC proportion in the shell | with ZrC proportion in the shell | A 3-fuel element spheres |
|---|---|---|---|
| density of the fuel-free shell (g/cm$^3$) | 1.78 | 1.91 | 1.72 |
| thickness of the fuel-free shell (mm) | 3 ± 0.5 | 3 ± 0.5 | 5 ± 0.5 |
| load at break parallel to direction of molding | 29 | 31 | 24 |
| load at break vertical to direction of molding | 27 | 29 | 23 |
| SiC proportion in the shell (% by weight) | 10 | — | — |
| ZrC proportion in the shell (% by weight) | — | 22.3 | — |
| SiC volume fraction in the shell (% by volume) | 6.8 | — | — |
| ZrC volume fraction in the shell (% by volume) | — | 8.6 | — |
| Corrosion rate at 1000° C. and 1% by volume H$_2$O— vapor (mg/cm$^2$ per hour) | 0.41 | 0.39 | 1.24-1.7 |

It can be seen from the table that density and load at break of the fuel element spheres are significantly improved by application of SiC or ZrC. It is emphasized that corrosion resistance is particularly improved. With values of 0.41 and 0.39 mg/cm$^3$ per hour the corrosion rate is almost decreased by a factor of 3 when compared to the respective value for A 3 fuel element spheres and even by the factor of 1.7 when compared to the reactor graphite ATJ of the supplier UCC.

The SiC proportion in the fuel element sphere shell of 10% by weight amounts to 5.32 g. This value is relatively low and confirms nearly a value of 5.28 g of the SiC coating of 23.300 fuel element particles in a sphere. These 23.300 particles together comprise 14 g uranium (all together). Because of the relatively high density of ZrC when compared to SiC the volume fractions of both carbides in the sphere shell only differ insignificantly.

The invention claimed is:

1. A spherical fuel element for high temperature pebble bed nuclear reactors which is a fuel-sphere core surrounded by a fuel-free graphite matrix shell seamlessly bonded with a sphere core, wherein the sphere core comprises an A 3 graphite matrix containing coated fuel particles homogenously distributed in the sphere core and embedded into the A 3 graphite matrix, and wherein the main components of the graphite matrix of the shell are natural graphite, graphitized petroleum coke and optionally binder coke, and wherein the fuel-free shell of the fuel element sphere contains at least one of silicon carbide (SiC) or zirconium carbide (ZrC) or both, and the shell has an average nominal thickness of 0.5 mm to 5.5 mm.

2. Fuel element sphere according to claim 1 characterized in that the average nominal thickness of the shell is ≧2 mm.

3. Fuel element sphere according to claim 1 characterized in that the average nominal thickness of the shell is in the range of from 3 mm to 5 mm.

4. Fuel element sphere according to claim 3 characterized in that the shell contains silicon carbide and the silicon carbide proportion in the fuel-free shell is in the range of from 6 to 14% by weight.

5. The fuel element sphere according to claim 3 characterized in that the shell contains zirconium carbide and the zirconium carbide proportion in the fuel-free shell is in the range of from 10 to 30% by weight.

6. Method for production of fuel element spheres according to claim 1 characterized by molding the fuel element spheres and utilizing a molding powder for the shell containing at least one of silicon or zirconium oxides.

7. Method according to claim 6 wherein the at least one of silicon and zirconium oxide is suspended in a solution of methanol and phenol formaldehyde resin and this suspension is homogenously mixed with a graphite powder comprising natural graphite and graphitized petroleum coke by kneading at room temperature.

8. Method according to claim 7, wherein the conversion of said oxide into the corresponding carbide is effected by annealing the fuel element spheres in vacuum (P<10$^{-2}$ hPa) and a maximum temperature of 2000° C.

9. Method according to claim 6, wherein the conversion of said oxide into the corresponding carbide is effected by annealing the fuel element spheres in vacuum (P<10$^{-2}$ hPa) and a maximum temperature of 2000° C.

10. Fuel element sphere according to claim 2 characterized in that the shell contains silicon carbide and the silicon carbide proportion in the fuel-free shell is in the range of from 6 to 14% by weight.

11. The fuel element sphere according to claim 2 characterized in that the shell contains zirconium carbide and the zirconium carbide proportion in the fuel-free shell is in the range of from 10 to 30% by weight.

12. Fuel element sphere according to claim 1 characterized in that the shell contains silicon carbide and the silicon carbide proportion in the fuel-free shell is in the range of from 6 to 14% by weight.

13. The fuel element sphere according to claim 1 characterized in that the shell contains zirconium carbide and the zirconium carbide proportion in the fuel-free shell is in the range of from 10 to 30% by weight.

14. Fuel element sphere according to claim 1 characterized in that the shell contains silicon carbide and the silicon carbide proportion in the fuel-free shell is in the range of from 8 to 12% by weight.

15. Fuel element sphere according to claim 1 characterized in that the shell contains silicon carbide and the silicon carbide proportion in the fuel-free shell is in the range of from 9 to 10% by weight.

16. The fuel element sphere according to claim 1 characterized in that the shell contains zirconium carbide and the zirconium carbide proportion in the fuel-free shell is in the range of from 19 to 25% by weight.

17. The fuel element sphere according to claim 1 characterized in that the shell contains zirconium carbide and the zirconium carbide proportion in the fuel-free shell is in the range of from 20 to 23% by weight.

\* \* \* \* \*